US010179976B2

(12) United States Patent
Alias et al.

(10) Patent No.: US 10,179,976 B2
(45) Date of Patent: Jan. 15, 2019

(54) INDUSTRIAL TEXTILE

(71) Applicant: VOITH PATENT GMBH, Heidenheim (DE)

(72) Inventors: Anas Alias, Ipoh (MY); Juergen Abraham, Nattheim (DE)

(73) Assignee: Voith Patent GmbH, Heidenheim (DE)

( * ) Notice: Subject to any disclaimer, the term of this patent is extended or adjusted under 35 U.S.C. 154(b) by 90 days.

(21) Appl. No.: 15/309,227

(22) PCT Filed: Apr. 7, 2015

(86) PCT No.: PCT/EP2015/057450
§ 371 (c)(1),
(2) Date: Nov. 7, 2016

(87) PCT Pub. No.: WO2015/169520
PCT Pub. Date: Nov. 12, 2015

(65) Prior Publication Data
US 2017/0121907 A1    May 4, 2017

(30) Foreign Application Priority Data

May 9, 2014    (DE) ......................... 10 2014 208 744

(51) Int. Cl.
*D21F 7/10*    (2006.01)
*D21F 1/00*    (2006.01)
(Continued)

(52) U.S. Cl.
CPC .............. *D21F 7/10* (2013.01); *B65G 15/30* (2013.01); *B65G 15/34* (2013.01); *D21F 1/0054* (2013.01); *D21F 1/12* (2013.01); *D21F 7/12* (2013.01)

(58) Field of Classification Search
CPC ..... D21F 7/10; D21F 7/12; D21F 1/12; D21F 1/16; D21F 1/0054; D03D 1/00; D03D 3/04; D03D 11/02; D03D 13/00
(Continued)

(56) References Cited

U.S. PATENT DOCUMENTS 4,026,331 A * 5/1977 Lees ..................... D21F 1/0054
                                               139/383 A
5,405,669 A * 4/1995 Lidar ....................... D03D 3/04
                                              139/383 AA
(Continued)

FOREIGN PATENT DOCUMENTS

DE          19923088 C1    10/2000
EP          1054097 A1     11/2000
(Continued)

*Primary Examiner* — Eric Hug
(74) *Attorney, Agent, or Firm* — Laurence A. Greenberg; Werner H. Stemer; Ralph E. Locher

(57) ABSTRACT

An industrial textile for use in a fibrous web forming and/or processing machine has a transversal edge section which can be joined together to render the textile endless. MD-yarns are interwoven with CD-yarns. At least two adjacent MD-yarns form a group, the MD-yarns of each MD-yarn group weaving side-by-side the same weave path with the CD-yarns. Each of the MD-yarn groups has adjacent first and second MD-yarns. The first MD-yarn of a MD-yarn group is non-adjacent the first MD-yarn of an adjacent MD-yarn group and the second MD-yarn of said MD-yarn group is non-adjacent the second MD-yarn of the adjacent MD-yarn group. At each transversal edge section the first MD-yarn of a first MD-yarn group forms a first loop and weaves back into the weave path of the first MD-yarn of a second MD-yarn group. The second MD-yarn group is adjacent the first MD-yarn group.

16 Claims, 9 Drawing Sheets

(51) Int. Cl.
     *D21F 1/12*           (2006.01)
     *B65G 15/34*         (2006.01)
     *B65G 15/30*         (2006.01)
     *D21F 7/12*           (2006.01)

(58) Field of Classification Search
     USPC .................................. 162/904; 139/383 AA
     See application file for complete search history.

(56)               References Cited

U.S. PATENT DOCUMENTS 6,332,480 B1    12/2001   Best
2015/0211179 A1     7/2015   Alias et al.

FOREIGN PATENT DOCUMENTS

JP         2011246834 A     12/2011
WO          9215743 A1      9/1992
WO        2014016364 A1     7/2013
WO    WO 2014/016364    *   1/2014   ........... D21F 1/0027

\* cited by examiner

INDUSTRIAL TEXTILE

BACKGROUND OF THE INVENTION

Field of the Invention

The present invention relates to an industrial textile for use in machines for forming and/or processing fibrous webs like paper or non-wovens, like spon-bond or melt-blown webs.

The present invention preferably relates to an industrial fabric used as a dryer fabric in a papermaking machine.

Industrial textiles can be made flat and joined endless either during their manufacture or in the web processing and/or forming machine. In the later case they are called on-machine seamable fabrics or textiles. As an example, seam loops are formed at each of the transverse end of the textile. To make the industrial textile endless when drawn into the machine, the two transversal edge sections are brought together and the seam loops at the different transversal edge sections are interdigitated to form a common channel through which a seam pintle is pulled for joining the two transversal edge sections. In many cases each of the seam loops is formed at the respective transversal edge section of the fabric, by weaving of an MD-yarn with the CD-yarns, passing beyond the CD-yarn which is closest to the transversal edge section, by forming a loop and by weaving back into the fabric at least some of the CD-yarns.

The seam area is the weakest part of the fabric, because the tensile strength of the seam is significantly lower than the tensile strength of the body of the fabric. Further on the seam area tends to cause hydraulic and/or topographic marking of the fibrous web formed and/or processed thereon due to the different structure of the seam area in regard to the body of the fabric.

In the past many attempts have been made to improve the tensile strength of the seam on one hand and to reduce the marking of the seam on the other hand.

Prior art document EP 1 054 097 for example describes a seam construction where the MD-yarn forming a seam loop weaves back into the weave path of the adjacent MD-yarn. The seam construction of this solution shows several disadvantages caused by an extreme bending of the MD-yarns when forming the loops when weaving back into the weave path of the adjacent MD-yarn. The extreme bending of the MD-yarns forming the loops imparts an increased strain into these MD-yarns causing the loops on one hand tend to tilt in an upright position out of the planes of the web and machine sides of the fabric and on the other hand to increase the spacing between the loops which are arranged along the transverse ends of the fabric. Such a tilting of the loops as well as the increase in spacing between the loops causes an increase in topographical marking. The increase in spacing between the loops further increases air permeability in the seam area in relation to the body of the fabric. This causes an increase in drying marking due to differences in evaporation velocity and intensity. Due to increased strain such a seam construction further shows relatively weak tensile strength, because the back woven part of the MD-yarns can be pulled out relatively easy.

BRIEF SUMMARY OF THE INVENTION

The object of the present invention therefore is to provide a seam construction which has reduced marking and increased seam strength.

The object is solved by an industrial textile for a fibrous web forming and/or processing machine, which has a web contacting side and a machine contacting side and which has at each of its longitudinal ends a transversal edge section. To make the textile endless the two transversal end sections can be joined together. The textile comprises or consists of a fabric made from MD-yarns interwoven with CD-yarns, wherein the MD-yarns are arranged in groups of at least two adjacent MD-yarns (MD-yarn group). The MD-yarns of each MD-yarn group weave side-by-side the same weave path with the CD-yarns. Each of the MD-yarn groups comprises a first MD-yarn and a second MD-yarn which are adjacent to each other in the respective MD-yarn group. Further on the first MD-yarn of a MD-yarn group is non-adjacently arranged to the first MD-yarn of an adjacent MD-yarn group and the second MD-yarn of said MD-yarn group is non-adjacently arranged to the second MD-yarn of said adjacent MD-yarn group.

The industrial textile of the present invention is characterized in, that at each transversal edge section the first MD-yarn of a first MD-yarn group forms a first loop and weaves back into the weave path of the first MD-yarn of a second MD-yarn group, wherein the second MD-yarn group is adjacent to the first MD-yarn group.

By providing an industrial textile with the features according to claim 1 of the present invention, a seam construction is provided which imparts much less bending and therefore less strain onto the MD-yarn forming a loop as it is the case for seam constructions known from prior art. The seam loops therefore tend to tilt less, which provides a smoother seam with more balanced spacing compared to the body of the fabric.

The term "body of the fabric" is defined by the biggest uniform area of the woven structure. The body of the fabric for example does not include the seam area of the fabric at the transversal end sections and can exclude the sections along the longitudinal edges of the fabric.

The wording "a MD-yarn forms a loop and weaves back into the weave path of another MD-yarn" means that a considered MD-yarn first weaves with several CD-yarns at a transversal edge section, when returning into the fabric after forming a loop. In this case the weaving of the MD-yarn with some of the CD-yarns after forming the loop takes place at a location which should be occupied by the other MD-yarn. This means that the MD-yarn weaves with some of the CD-yarns instead of the other MD-yarn. After a weaving for a certain distance with the CD-yarns when returning back into the fabric the weaving of the MD-yarn with CD-yarns stops and the other MD-yarn takes over in weaving with the remaining CD-yarns.

Preferred improvements and embodiments of the present invention are described in the sub-claims.

According to a first embodiment, the second MD-yarn of the first MD-yarn group forms a second loop and weaves back into the weave path of the second MD-yarn of the second MD-yarn group.

According to a further embodiment of the present invention it is foreseen that at each transversal edge section the fabric provides a plurality first and second MD-yarn groups which are arranged such that, between two adjacent first MD-yarn groups a single second MD-yarn group is located and between two second adjacent MD-yarn groups a single first MD-yarn group is located.

A first and an adjacent second MD-yarn group can define a pair of first and second MD-yarn groups.

Each of the MD-yarn groups can consist of only the first and second MD-yarn. Alternatively each of the MD-yarn groups can consist of more MD-yarns than the first and the second MD-yarn. In concrete each of the MD-yarn groups can consist of the first, the second and a third MD-yarn and optionally of a forth MD-yarn.

By doing so the first and second MD-yarn groups are equally distributed over the whole length extension of the transversal edge section which is the width of the fabric and/or the industrial textile.

According to a preferred embodiment of the present invention, the industrial textile comprises seam loops, some of the seam loops are arranged at the one transversal edge section and some others of the seam loops are arranged at the other transversal edge section, to make the industrial textile endless the two transversal edge section can be brought together and the seam loops of the different transversal edge sections can be interdigitated for forming a common channel through which a seam pintle can be pulled for joining the two transversal edge sections. In this case it is possible, that at least some of the first and/or second loops form seam loops.

According to a further embodiment of the present invention it is possible that the industrial textile comprises seam securing loops, some of the seam loops are arranged at the one transversal edge section and some others of the seam loops are arranged at the other transversal edge section, the seam securing loops pass around the CD-yarn or CD-yarn group which is closest to the respective transversal edge section to hold this CD-yarn or CD-yarn group in position.

It is possible that at least some of the second loops form seam securing loops and that at least some of the first loops form seam loops. More preferably it is possible that all of the second loops form seam securing loops and that all of the first loops form seam loops.

Alternatively it is possible that at least some of the first loops form seam securing loops and that at least some of the second loops form seam loops. More preferably it is possible that all of the first loops form seam securing loops and that all of the second loops form seam loops.

In the above described cases one of the loops—either the first or the second loop- of the pairs of MD-yarn groups forms a seam loop through which a pintle can be pulled and the other of the loops forms a seam securing loop to hold the CD-yarn or CD-yarn group which is closest to the respective transversal edge section in position.

It is further possible that for at least some of the pairs, preferably for all pairs of first and second MD-yarn groups, the first and the second loop of the respective pair form seam loops. In this case the seam strength can be significantly increased, because the tensile stain acting on the seam is distributed to two seam loops per pair, in concrete to the first and the second loop of the respective pair of first and second MD-yarn groups. Further on the air permeability at the seam is reduced due the two seam loops per pair. This is especially an advantage if the body of the fabric has a low air permeability. In this case there is no to big difference in air permeability between the body of the fabric and the seam of the fabric.

According to a further embodiment it can be foreseen that at each transversal edge section the first MD-yarn of a third MD-yarn group forms a third loop and weaves back into the weave path of the second MD-yarn of the third MD-yarn group or vice versa. This embodiment can be especially advantageous in combination with the above described embodiment, at which at least some of the pairs of first and second MD-yarn groups, preferably for all pairs of first and second MD-yarn groups, form two seam loops (the first MD-yarn and the second MD-yarn of the first MD-yarn group form seam loops). In concrete it can be foreseen, that at each transversal edge section the fabric provides a plurality first, second and third MD-yarn groups which are arranged such that, adjacent first and second MD-yarn groups form pairs of MD-yarn groups, wherein between two adjacent pairs of MD-yarn groups a single third MD-yarn group is located. The sequence of the neighboring MD-yarn groups in this case can be such that adjacently to the third MD-yarn group a first MD-yarn group is located and adjacently to said first MD-yarn group a second MD-yarn group is located. This sequence is repeated several times at each transversal edge section.

Preferably at least some of the third loops form seam securing loops. Based on that it is possible that each of the pairs of first and second MD-yarn groups form a first and a second loop and between two adjacent pairs of first and second MD-yarn groups a third MD-yarn group is located forming a seam securing loop to hold the CD-yarn or CD-yarn group which is closest to the respective transversal edge section in position.

Alternatively to the seam loops the industrial textile according can comprises a seaming element at each transversal edge section. To make the industrial textile endless the seaming elements located at the two transversal edge sections can be joined, when bringing the two transversal edge sections together. Each of the seaming elements can be hold by at least some of the first and/or second and/or third loops.

More preferably the fabric only comprises first and second loops—therefore no third loops—which hold the seaming element. The seaming element can comprise a spiral or a hook-array or a zipper which is arranged on each transversal edge section and extends in its length along the respective transversal edge section. If the seaming element is a spiral, at each transversal edge section a spiral is located. To make the industrial textile endless the two spirals are interdigitated to form a common channel through which a pintle is pulled.

Preferably the fabric is flat woven. The fabric can be a single layer fabric, to provide an easy to clean and easy to manufacture construction. The body of the fabric can have an air permeability of less than 145 cfm, preferably of between 135 cfm to 55 cfm, most preferably between 130 cfm and 45 cfm.

Further on the CD-yarns can be arranged in groups of at least two adjacent CD-yarns (CD-yarn groups), wherein the CD-yarns of each CD-yarn group weaving side-by-side the same weave path with the MD-yarns. In this regard it is possible that each of the CD-yarn groups consists of a first and second CD-yarn.

At least some of the CD-yarns can have a circular cross section. The CD-yarns which are arranged in CD-yarn groups, preferably have the circular cross section. According to an embodiment all CD-yarns are grouped. At least some of the CD-yarns can be flat CD-yarns, with a binodal or elliptical or rectangular cross section.

According to a further embodiment all the CD-yarns have a flat cross section. The width to height aspect ratio can be from between 1.7:1 to 6:1, preferably 1.7:1 to 4:1. The CD-yarns which are flat CD-yarns, preferably are not arranged in CD-yarn groups.

The MD-yarns can have a circular cross section or a rectangular cross section. If the MD-yarns have a rectangular cross section, they can have a width to height aspect ratio from between 1.4:1 to 2.0:1.

The MD-yarns and/or the CD-yarns preferably are monofilaments. The monofilaments can be from PET, PPS, PCTA.

It is also possible that a first portion of the MD-yarns and/or the CD-yarns are monofilaments from PET and a second portion of the MD-yarns are monofilaments from PPS. Preferably from between 30% to 70% of the MD-yarns and/or the CD-yarns are monofilaments from PET and from between 70% to 30% of the MD-yarns and/or the CD-yarns are monofilaments from PPS.

Alternatively a first portion of the MD-yarns and/or the CD-yarns are monofilaments from PPS and a second portion of the MD-yarns are monofilaments from PCTA.

The industrial fabric preferably is a dryer fabric for use in a papermaking machine or a conveyor fabric for use in a spun-bond web or melt-blown web making machine.

BRIEF DESCRIPTION OF THE SEVERAL VIEWS OF THE DRAWING

The invention will be further described by way of no limiting examples on the basis of schematic drawings. It shows FIG. 1 a top view onto a web contacting side of an industrial textile according to a first embodiment of the present invention, FIG. 2 two cross sectional views taken along the weave paths of MD-yarns forming adjacent loops, FIG. 3 a top view onto a web contacting side of an industrial textile according to a second embodiment of the present invention, FIG. 4 two cross sectional views taken along the weave paths of MD-yarns forming adjacent loops, FIG. 5 a top view onto a web contacting side of an industrial textile according to a third embodiment of the present invention, FIG. 6 three cross sectional views taken along the weave paths of MD-yarns forming adjacent loops, FIG. 7 a top view onto a web contacting side of an industrial textile according to a forth embodiment of the present invention, FIG. 8 five cross sectional views taken along the weave paths of MD-yarns forming adjacent loops, FIG. 9 a top view onto a web contacting side of an industrial textile according to a fifth embodiment of the present invention and FIG. 10 a top view onto a web contacting side of an industrial textile according to a sixth embodiment of the present invention,

DESCRIPTION OF THE INVENTION

For all the embodiments shown in FIGS. 1 to 10 the industrial textile 100 mainly consists of a fabric 103. Mainly means in this regard that the industrial textile does not have any additional layers in addition to the woven fabric like batt or film layers. The fabric can have at its lengthwise edges edge sealing coatings or the like and at its transversal edge sections seaming elements in addition to seam loops formed by the MD-yarns which are part of the woven fabric structure.

The fabrics shown in the following embodiments can be flat woven and are of a single layer construction, that means with no two different MD-yarn layers and/or no two different CD-yarn layers.

The body of the fabrics shown can have an air permeability of less than 135 cfm, preferably of between 130 cfm to 55 cfm.

If MD-yarns are grouped they can have a circular as well as a flat cross section.

If the CD-yarns are grouped they preferably have a circular cross section. If the CD-yarns are flat they are preferably not arranged in CD-yarn groups.

Figure 1:
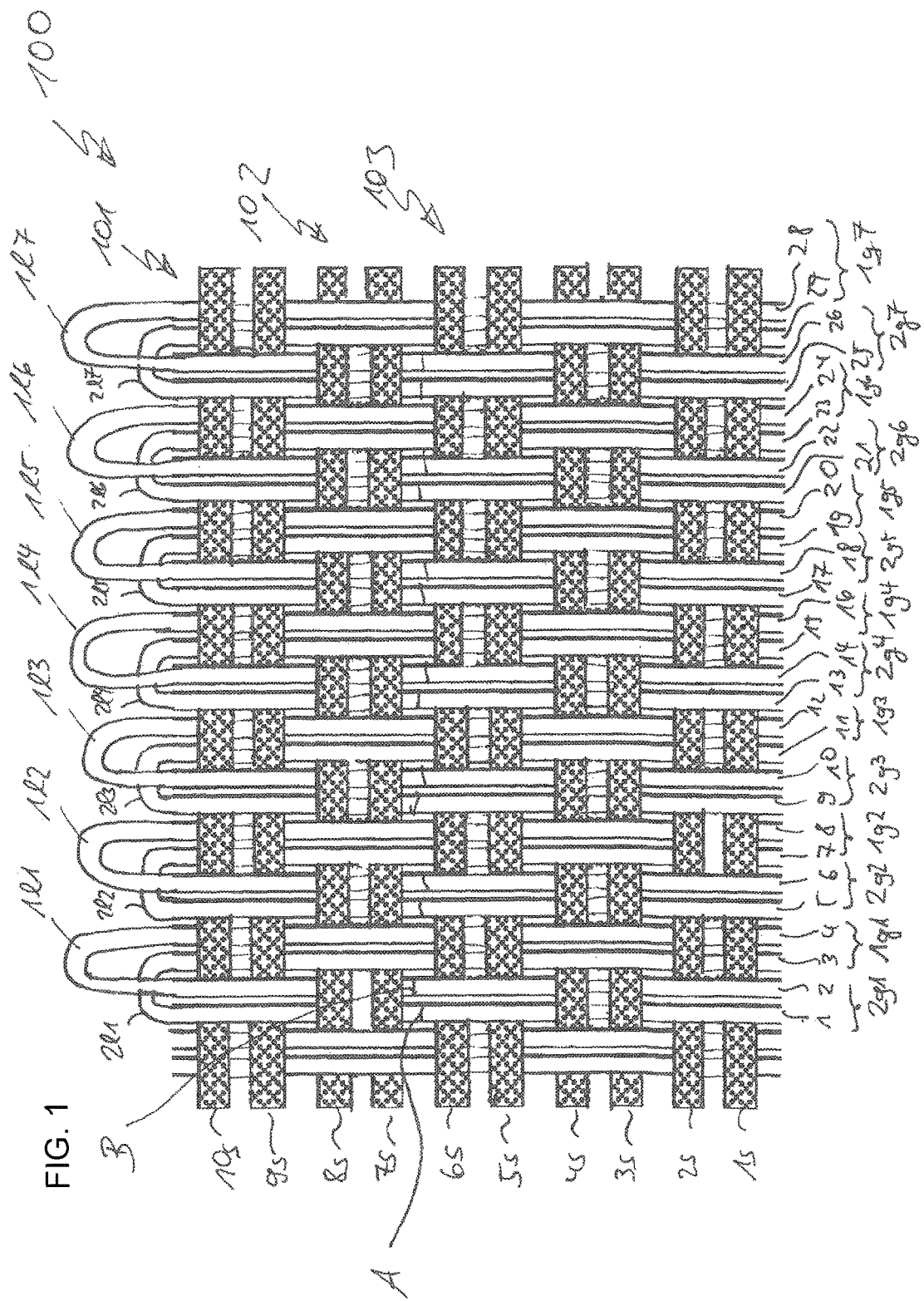
Figure 2:
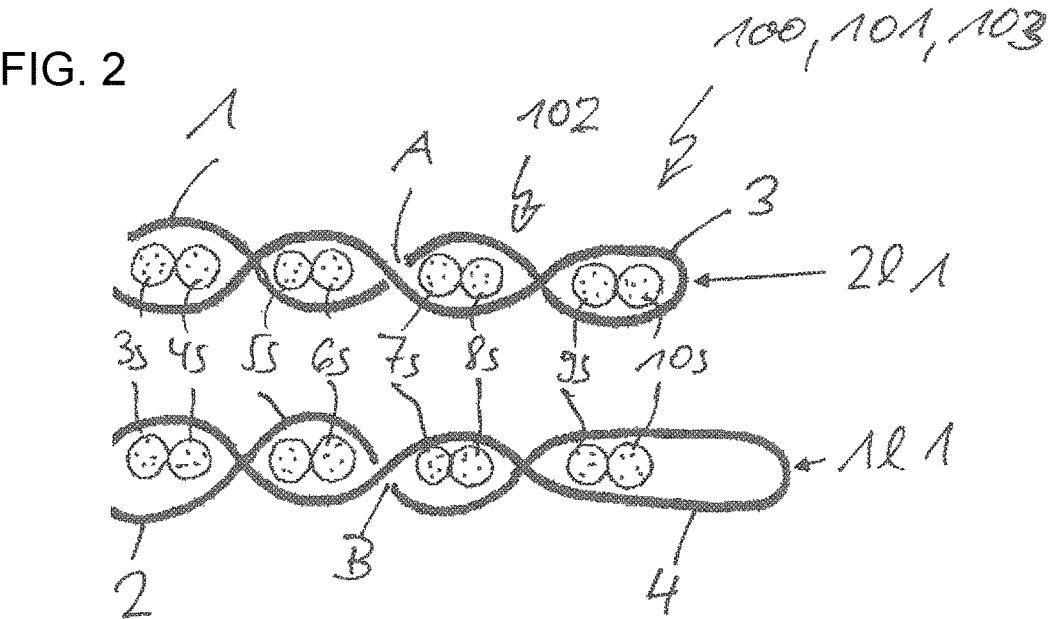

FIG. 1 shows a top view onto a web contacting side of an industrial textile 100 according to a first embodiment of the present invention. FIG. 2 shows the industrial textile 1 of FIG. 1 along two cross sectional views taken along the weave paths of first MD-yarns 2 and 4 as well as second MD-yarns 1 and 3.

The industrial textile 100 has the web contacting side 102 and a opposite machine contacting side. The industrial textile 100 further has at each of its two longitudinal ends a transversal edge section 101. One of these transversal end sections is shown in current FIGS. 1 and 2.

The textile 100 comprises a fabric 103 made from MD-yarns 1 to 28 interwoven with CD-yarns 1s to 10s. As can be seen, the MD-yarns 1 to 28 are arranged in groups of two adjacent MD-yarns (MD-yarn group). The MD-yarns of each MD-yarn group weave side-by-side the same weave path with the CD-yarns 1s to 10s. For example MD-yarns 1, 2 form a MD-yarn group and MD-yarns 3, 4 form another MD-yarn group. Further on CD-yarns are arranged in groups of two adjacent CD-yarns weaving side-by-side the same weave path with the MD-yarns 1 to 28. For example CD-yarns 1s, 2s form a CD-yarn group and CD-yarns 3s, 4s form another CD-yarn group.

Each of the MD-yarn groups comprises a first MD-yarn 2, 4, 6, 8, 10, ... 28 (even numbered MD-yarns) and a second MD-yarn 1, 3, 5, 7, ... 27 (odd numbered MD-yarns) which are arranged such that i) the first and second MD-yarn of a group are adjacent to each other and ii) the first MD-yarn of said MD-yarn group is non-adjacent to the first MD-yarn of an adjacent MD-yarn group and iii) the second MD-yarn of said MD-yarn group is non-adjacent to the second MD-yarn of said adjacent MD-yarn group.

By way of example the first MD-yarn 8 of a MD-yarn group is adjacent to the second MD-yarn 7 of said MD-yarn group. The first MD-yarn 8 of said MD-yarn group is non-adjacent to the first MD-yarn 6 of an adjacent MD-yarn group and the second MD-yarn 7 of said MD-yarn group is non-adjacent to the second MD-yarn 5 of said adjacent MD-yarn group.

As can be seen, at each transversal edge section 101 the first and second MD-yarns are grouped in first MD-yarn groups 1g1 to 1g7 and second MD-yarn groups 2g1 to 2g7. By way of example: the first MD-yarn 4 and the second MD-yarn 3 form a first MD-yarn group 1g1, whereas the first MD-yarn 2 and the second MD-yarn 1 form a second MD-yarn group 2g1. The first and second MD-yarn groups 1g1 to 1g7, 2g to 2g7 are arranged such that, between two adjacent first MD-yarn groups 1g a single second MD-yarn group 2g is located and between two second adjacent MD-yarn groups 2g a single first MD-yarn group 1g is located.

For the first and second MD-yarn groups 1g1 to 1g7, 2g1 to 2g7 it can be seen that the first MD-yarns of the first MD-yarn groups 1g form first loops 1/1 to 1/7 and weave back into the weave path of the first MD-yarn of an adjacent second MD-yarn group 2g. Further on the second MD-yarn of the respective first MD-yarn groups forms a second loop 2/1 to 2/7 and weaves back into the weave path of the second MD-yarn of the adjacent second MD-yarn group 2g1 to 2g7. E.g. first MD-yarn 4 of first MD-yarn group 1g1 forms a first loop 1/1 and weaves back into the weave path of the first MD-yarn 2 of the adjacent second MD-yarn group 2g1 by weaving with CD-yarn 7s to 10s after forming the first loops 1/1 and returning back into the fabric 103. At position A the back weaving of first MD-yarn 4 of first MD-yarn group 1g1 ends and first MD-yarn 2 of second MD-yarn group 2g1 takes over.

Second MD-yarn 3 of the first MD-yarn group 1g1 forms a second loop 211 and weaves back into the weave path of the second MD-yarn 1 of the adjacent second MD-yarn group 2g1 by weaving with CD-yarn 7s to 10s after forming the second loop 211 and returning back into the fabric 103. At position B the back weaving of second MD-yarn 3 of first MD-yarn group 1g1 ends and second MD-yarn 1 of second MD-yarn group 2g1 takes over.

The first loops 1/1 to 1/7 form seam loops and the second loops 2/1 to 2/7 form seam securing loops.

To make the industrial textile 100 endless the seam loops arranged at each of the two transversal edge sections 101 can be brought together and interdigitated to form a common channel through which a seam pintle can be pulled for joining the two transversal edge sections 101. The seam securing loops pass around the CD-yarn group 9s, 10s which is closest to the respective transversal edge section 101 to hold this CD-yarn group 9s, 10s in position. The sequence of loop arrangements as shown in FIG. 2 is repeated several times to build up the seam at each transversal edge section.

Figure 4:
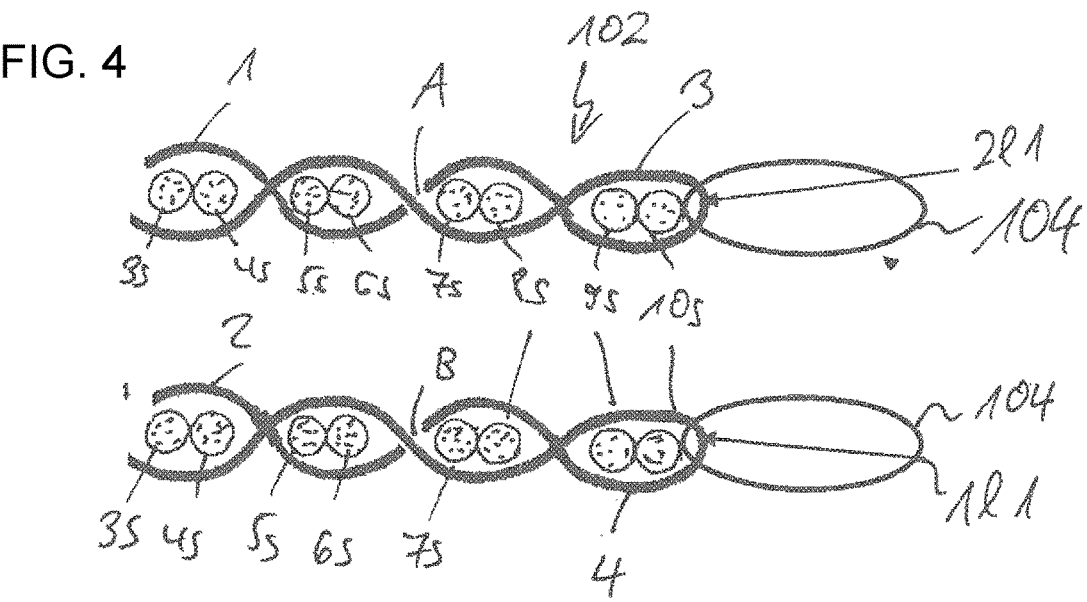
Figure 3:
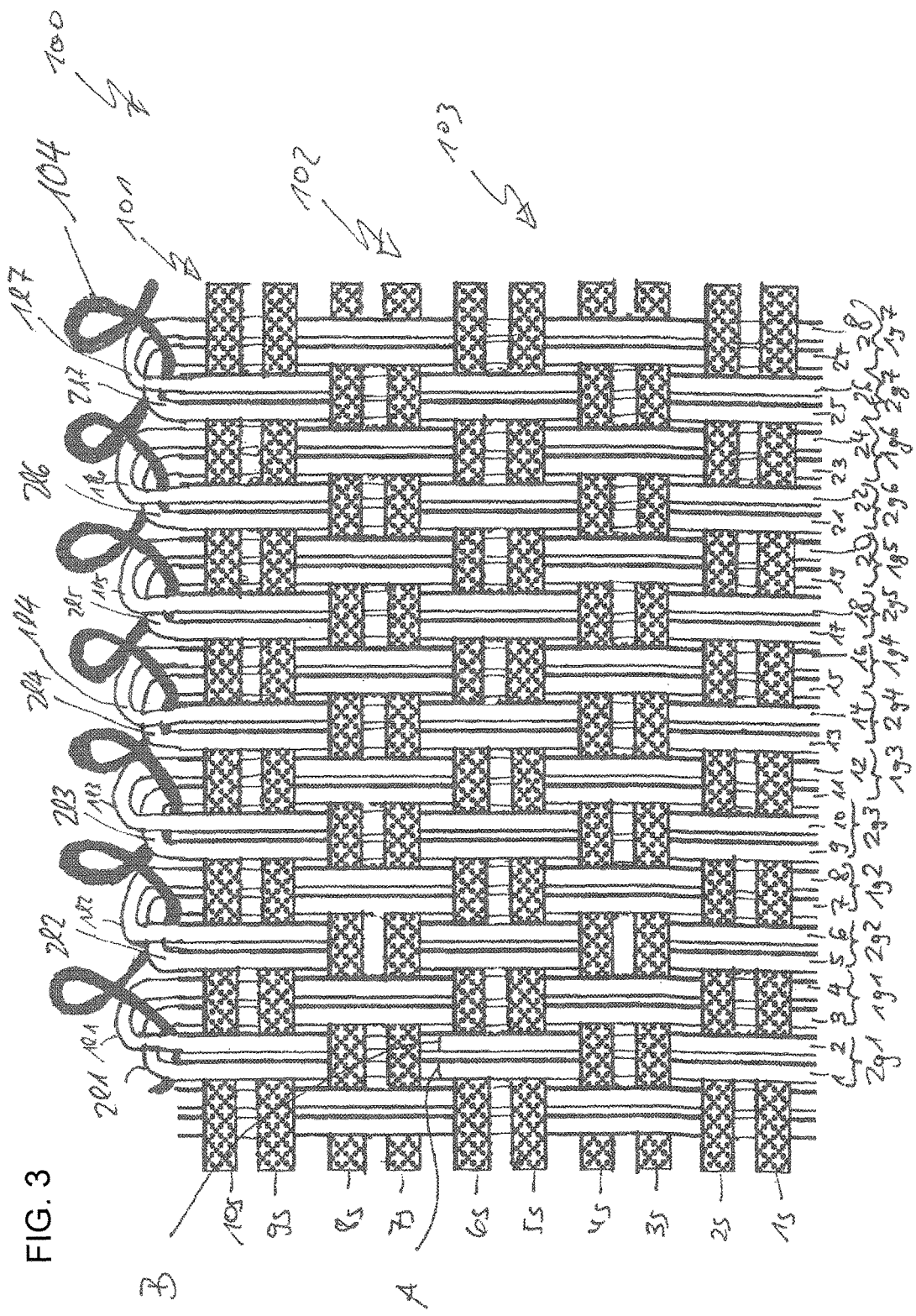

FIG. 3 shows a top view onto a web contacting side of an industrial textile 100 according to a second embodiment of the present invention. FIG. 4 shows the industrial textile 100 of FIG. 3 along two cross sectional views taken along the weave paths of first MD-yarns 2 and 4 as well as second MD-yarns 1 and 3.

In the following only the differences to the embodiment shown in FIGS. 1 and 2 will be discussed.

As can be seen the industrial textile 100 comprises at each transversal edge section 101, from which only one transversal edge section 101 is visible, a seaming element in the shape of a spiral 104. To make the industrial textile 100 endless, the two transversal edge sections can be brought together and the two spirals can be interdigitated to form a common channel through which a seam pintle can be pulled. As can be seen the spiral 104 is hold by the first loops 111 to 117 and by the second loops 211 to 217. The sequence of loop arrangements as shown in FIG. 4 is repeated several times to build up the seam at each transversal edge section.

Figure 5:
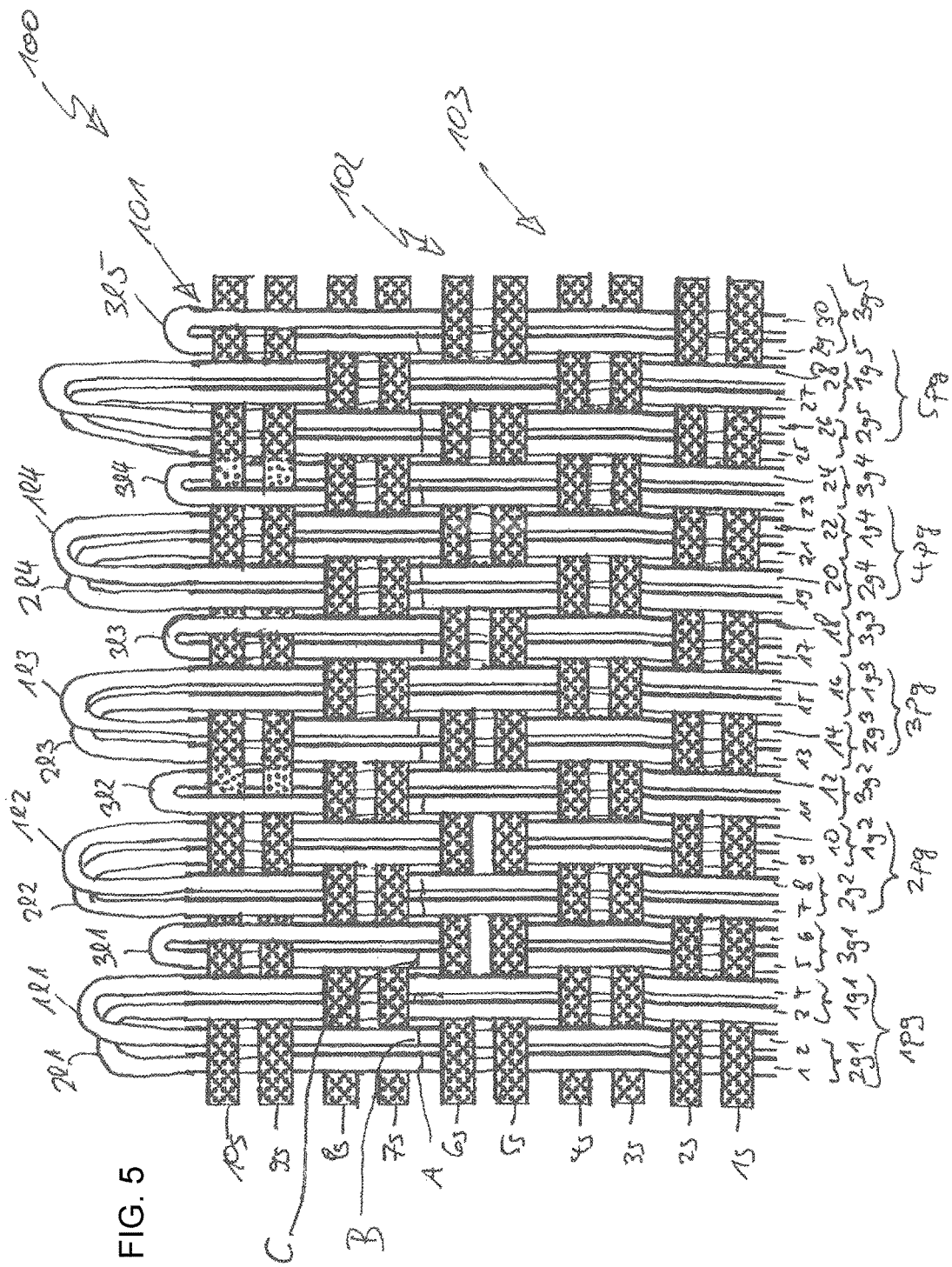
Figure 6:
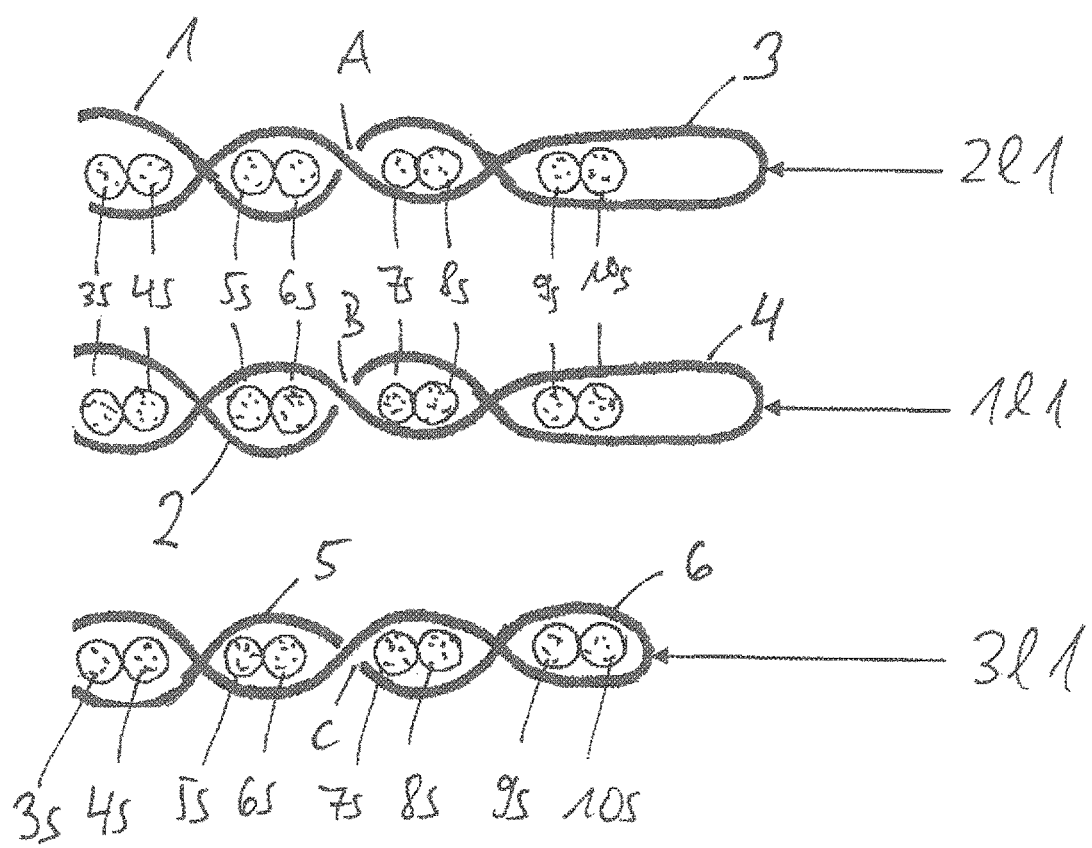

FIG. 5 shows a top view onto a web contacting side of an industrial textile 100 according to a third embodiment of the present invention. FIG. 6 shows the industrial textile 100 of FIG. 5 along three cross sectional views taken along the weave paths of first MD-yarns 2 and 4, second MD-yarns 1 and 3 as well as third MD-yarns 5 and 6.

In the following only the differences to the embodiment shown in FIGS. 1 and 2 will be discussed.

As can be seen the transversal edge section 101 comprises further to the first and second MD-yarn groups 1g1 to 1g5, 2g1 to 2g5 third MD-yarn groups 3g1 to 3g5. At each of the third MD-yarn groups 3g1 to 3g5 the first MD-yarn of the respective third MD-yarn group forms a third loop 3/1 to 3/5 and weaves back into the weave path of the second MD-yarn of this third MD-yarn group. E.g. first MD-yarn 6 of the third MD-yarn group 3g1 forms a third loop 3/1 and weaves back into the weave path of the second MD-yarn 5 of this third MD-yarn group 3g1. At each transversal edge section 101 from which only one is visible in FIGS. 5 and 6, the fabric 103 provides a plurality of first and second and third MD-yarn groups 1g1 to 1g5, 2g1 to 2g5 which are arranged such that, adjacently arranged first and second MD-yarn groups form pairs of MD-yarn groups 1pg to 5pg, wherein between two adjacent pairs of MD-yarn groups 1pg to 5pg a single third MD-yarn group 3g1 to 3g5 is located. The sequence of the neighboring MD-yarn groups in this case can be such that adjacently to the third MD-yarn group 3g1 to 3g5 a first MD-yarn group 1g1 to 1g5 is located and adjacently to said first MD-yarn group 1g1 to 1g5 a second MD-yarn group 2g1 to 2g5 is located. This sequence is repeated several times at each transversal edge section 101. E.g. the sequence of the neighboring MD-yarn groups is such that adjacently to the third MD-yarn group 3g1 the first MD-yarn group 1g1 is located and adjacently to said first MD-yarn group 1g1 the second MD-yarn group 2g1 is located.

As can be seen the first loops 1/1 to 1/5 and the second loops 2/1 to 2/5 form seam loops, whereas the third loops 3/1 to 3/5 form seam securing loops. The sequence of loop arrangements as shown in FIG. 6 is repeated several times to build up the seam at each transversal edge section.

Figure 7:
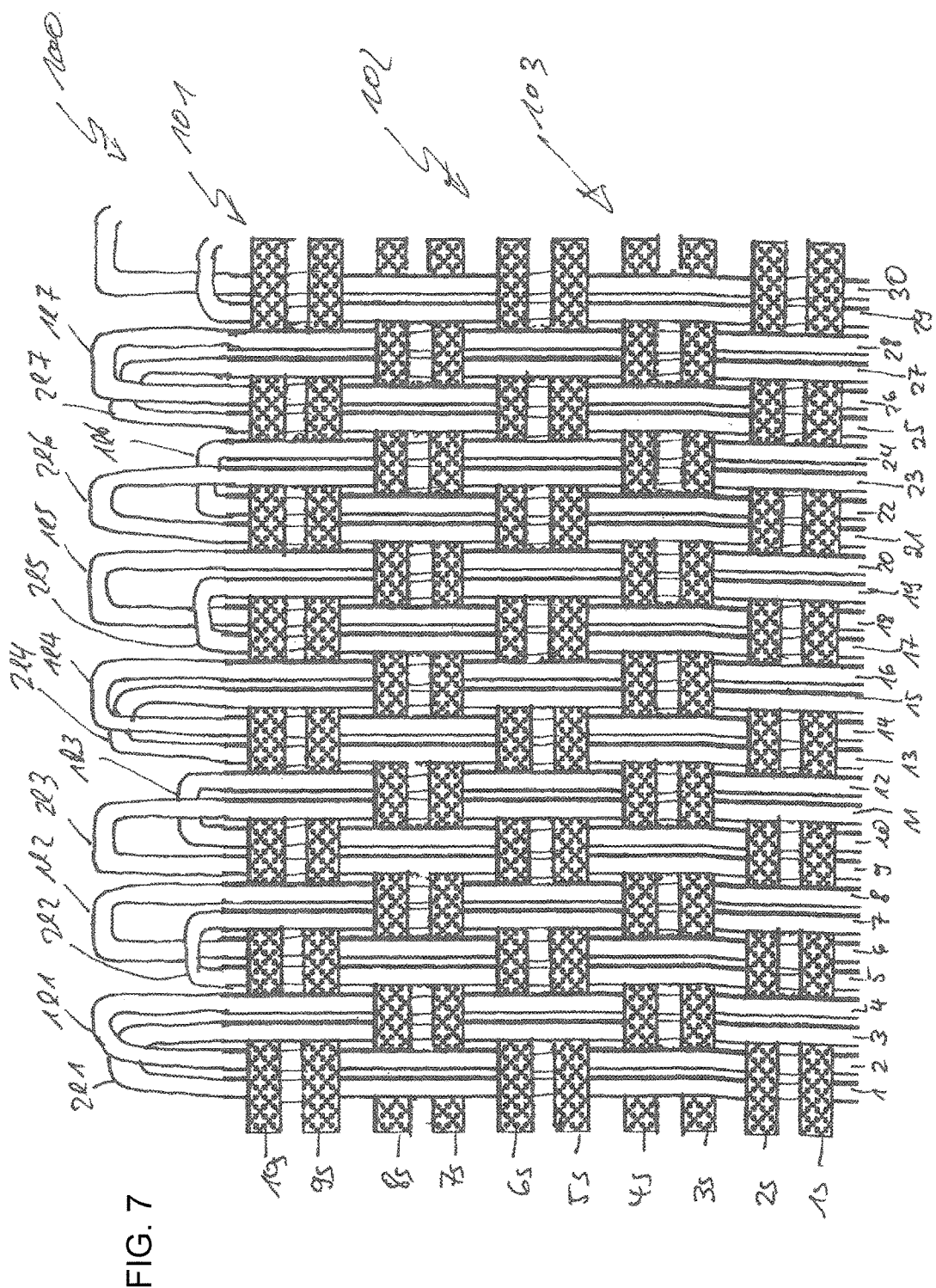
Figure 8:
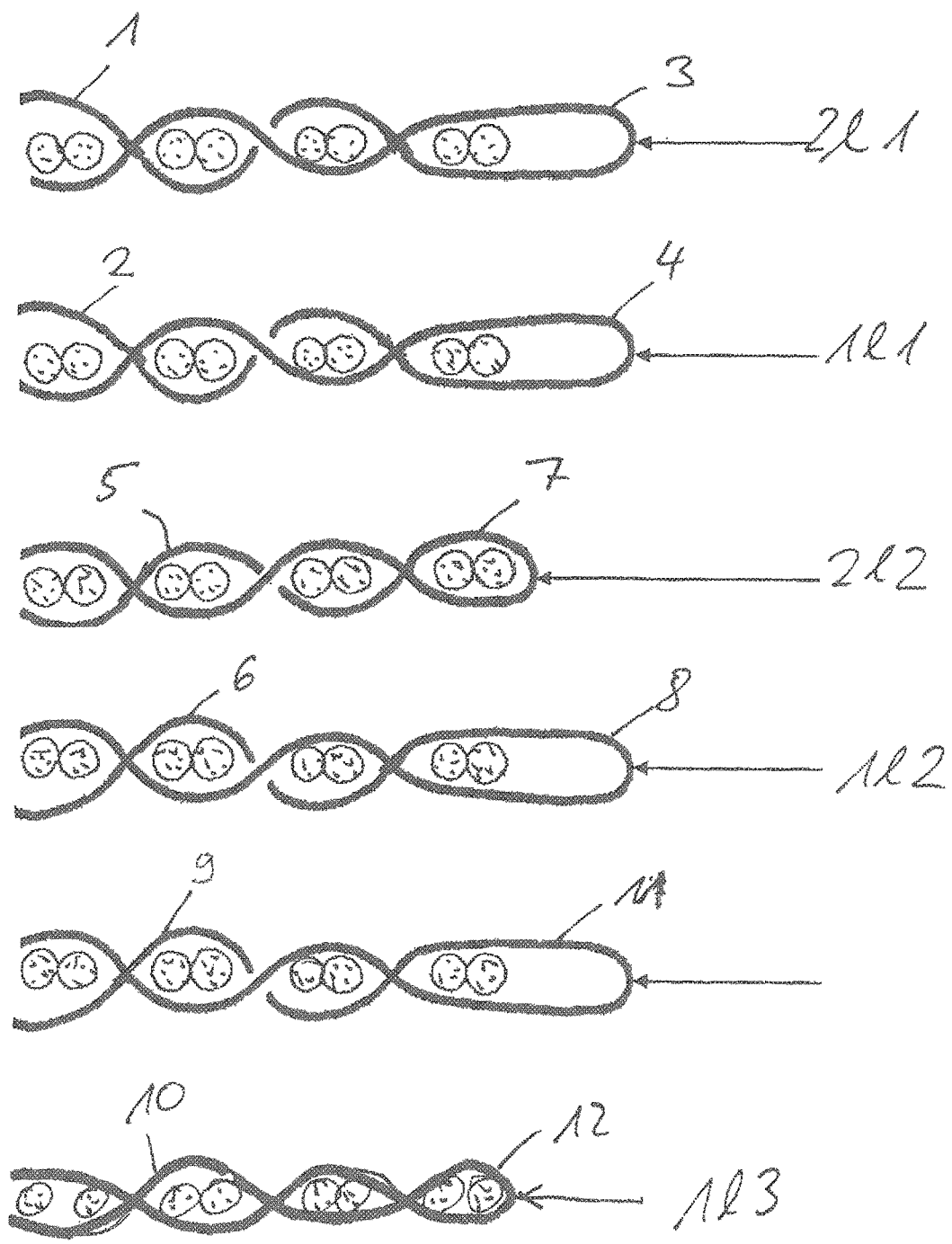

FIG. 7 shows a top view onto a web contacting side of an industrial textile 100 according to a forth embodiment of the present invention. FIG. 8 shows the industrial textile 100 of FIG. 7 along five cross sectional views taken along the weave paths of first MD-yarns 2 and 4 as well as 6 and 8 and second MD-yarns 1 and 3 as well as 5 and 7.

In the following only the differences to the embodiment shown in FIGS. 1 and 2 will be discussed.

In the embodiment shown in FIGS. 7 and 8 the first loops 1/1, 1/2, 1/4 1/5 and 1/7 as well as the second loops 2/1, 2/3, 2/4, 2/6 and 2/7 form seam loops, whereas the first loops 1/3, 1/6 and the second loops 2/2, 2/5 form seam securing loops. The sequence of loop arrangements as shown in FIG. 8 is repeated several times to build up the seam at each transversal edge section.

Figure 9:
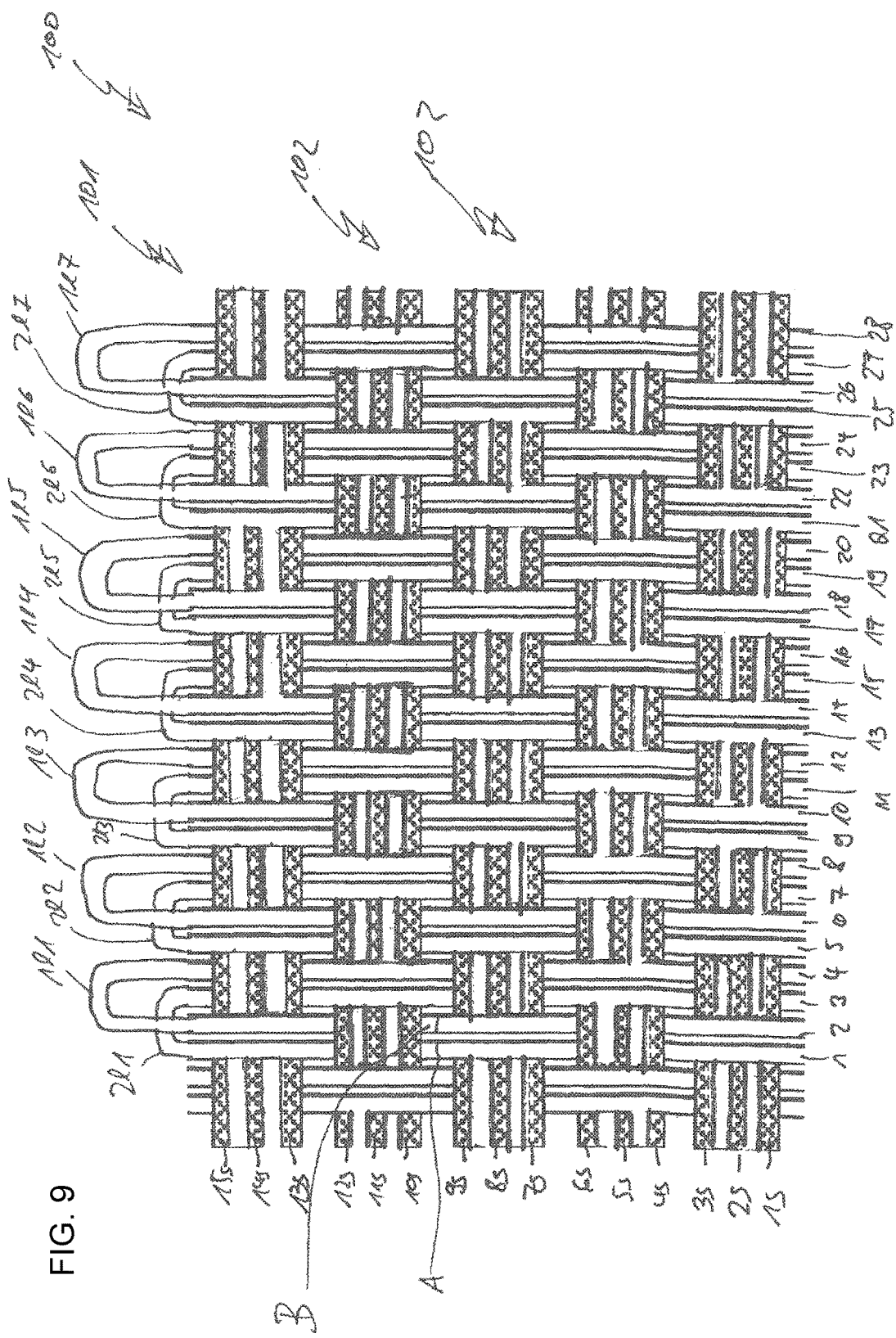

FIG. 9 shows a top view onto a web contacting side of an industrial textile 100 according to a fifth embodiment of the present invention.

In the following only the differences to the embodiment shown in FIGS. 1 and 2 will be discussed. As can be seen each CD-yarn group consists of three CD-yarns weaving side-by-side the same weave path with the MD-yarns 1 to 28. By way of example a first CD-yarn group consists of CD-yarns 1s to 3s.

Figure 10:
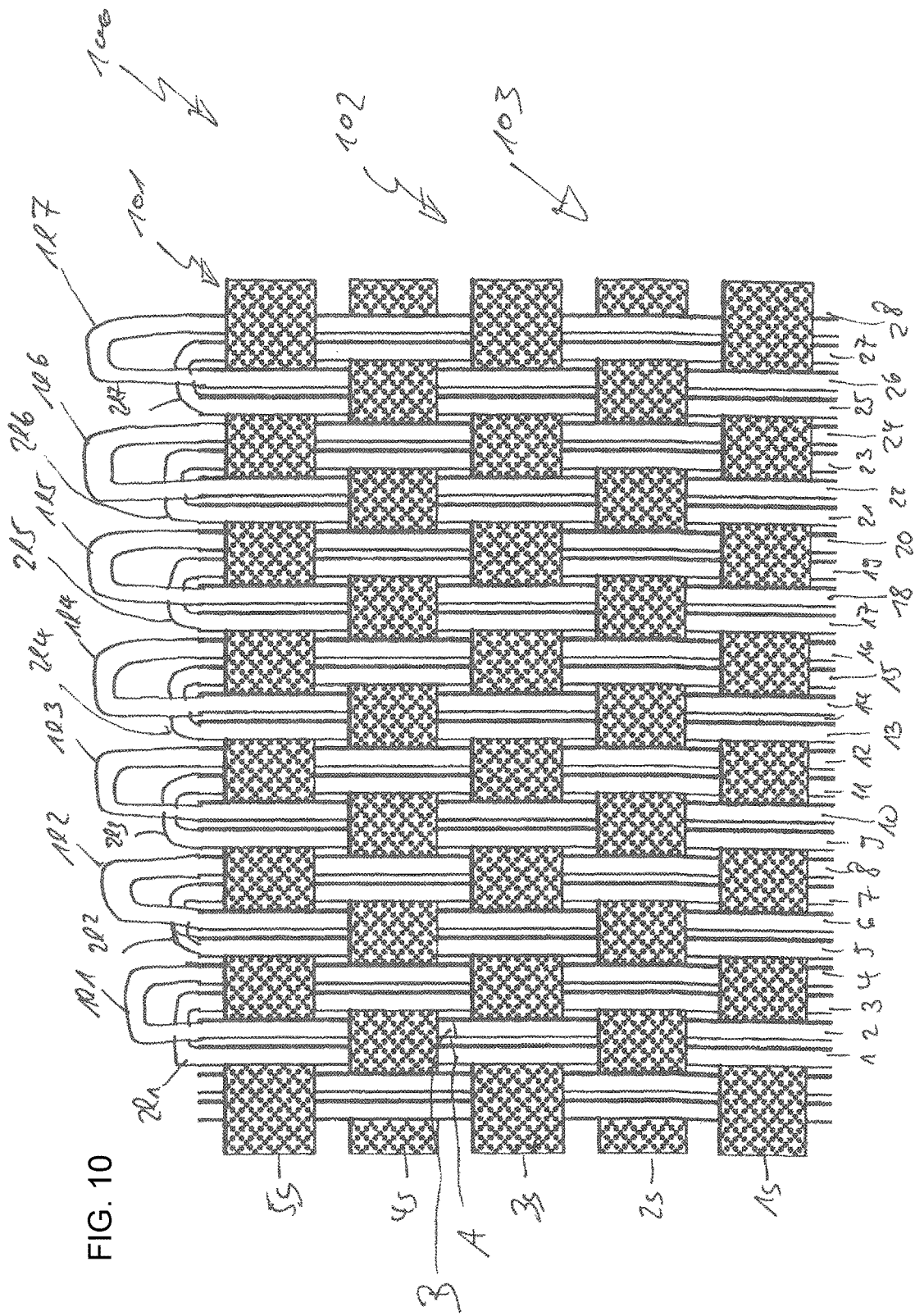

FIG. 10 shows a top view onto a web contacting side of an industrial textile 100 according to a fifth embodiment of the present invention.

In the following only the differences to the embodiment shown in FIGS. 1 and 2 will be discussed. As can be seen the CD-yarns 1s to 5s are not grouped. The CD-yarns 1s to 5s have a float cross section with a bimodal or elliptical or rectangular cross section and can have a width to height aspect ratio from between 1.7:1 to 4:1.

The invention claimed is:

1. An industrial textile for use in a fibrous web forming and/or processing machine, the textile comprising:
   a fabric having a web contacting side and a machine contacting side and having a transversal edge section at two longitudinal ends thereof to be joined together to render the textile endless;
   said fabric being made of MD-yarns interwoven with CD-yarns, said MD-yarns having MD-yarn groups formed of at least two adjacent MD-yarns;
   said MD-yarns of each said MD-yarn group weaving side-by-side the same weave path with said CD-yarns;
   each of said MD-yarn groups including a first MD-yarn and a second MD-yarn arranged such that said first and second MD-yarn are adjacent each other;

said first MD-yarn of an MD-yarn group being non-adjacent said first MD-yarn of an adjacent MD-yarn group and said second MD-yarn of said MD-yarn group being non-adjacent said second MD-yarn of said adjacent MD-yarn group;

wherein, at each said transversal edge section, said first MD-yarn of a first MD-yarn group forms a first loop and weaves back into the weave path of said first MD-yarn of a second MD-yarn group, and said second MD-yarn group is adjacent said first MD-yarn group.

2. The industrial textile according to claim 1, wherein said second MD-yarn of said first MD-yarn group forms a second loop and weaves back into the weave path of said second MD-yarn of said second MD-yarn group.

3. The industrial textile according to claim 1, wherein at each transversal edge section said fabric includes a plurality first and second MD-yarn groups which are arranged such that, between two adjacent first MD-yarn groups a single second MD-yarn group is located and between two second adjacent MD-yarn groups a single first MD-yarn group is located.

4. The industrial textile according to claim 1, which comprises seam loops, some of said seam loops being arranged at a first said transversal edge section and some other of said seam loops being arranged at a second said transversal edge section, wherein, to render the industrial textile endless, said first and second transversal edge sections can be brought together whereupon said seam loops of said first and second transversal edge sections are interdigitated for forming a common channel through which a seam pintle can be pulled for joining the two transversal edge sections.

5. The industrial textile according to claim 1, wherein at least some of said first and/or second loops form seam loops.

6. The industrial textile according to claim 1, which comprises seam securing loops, some of which are arranged at a first said transversal edge section and some of which are arranged at a second said transversal edge section, said seam securing loops passing around said CD-yarn or CD-yarn group which is closest to the respective said transversal edge section to hold the CD-yarn or CD-yarn group in position.

7. The industrial textile according to claim 1, wherein at least some of said first and/or second loops form seam securing loops.

8. The industrial textile according to claim 1, wherein at each transversal edge section said first MD-yarn of a third MD-yarn group forms a third loop and weaves back into the weave path of said second MD-yarn of said third MD-yarn group or vice versa.

9. The industrial textile according to claim 8, wherein at least some of said third loops form seam securing loops.

10. The industrial textile according to claim 8, which comprises a seaming element at each said transversal edge section which can be joined, and to render the industrial textile endless the two transversal edge sections can be brought together, each of the seaming elements being held by at least some of said first and/or second and/or third loops.

11. The industrial textile according to claim 10, wherein each said seaming element comprises a spiral or a hook-array or a zipper extending along each said transversal edge section.

12. The industrial textile according to claim 1, wherein said fabric is flat woven.

13. The industrial textile according to claim 1, wherein said fabric is a single layer fabric.

14. The industrial textile according to claim 1, wherein said fabric has an air permeability of less than 135 cfm.

15. The industrial textile according to claim 1, wherein said fabric has an air permeability between 130 cfm to 55 cfm.

16. The industrial textile according to claim 1, wherein said fabric is a dryer fabric for use in a papermaking machine or a conveyor fabric for use in a spun-bond web or melt-blown web making machine.

* * * * *